April 18, 1967     E. KADAK     3,315,031

SIGNAL INTERLACER

Filed May 18, 1964     3 Sheets-Sheet 1

INVENTOR.
EUGENE KADAK
BY
ATTYS.

April 18, 1967

E. KADAK 3,315,031

SIGNAL INTERLACER

Filed May 18, 1964

INVENTOR.
EUGENE KADAK

BY

*Don D. Doty*
ATTYS.

April 18, 1967  E. KADAK  3,315,031
SIGNAL INTERLACER

Filed May 18, 1964  3 Sheets-Sheet 3

INVENTOR.
EUGENE KADAK
BY
Don D. Doty
ATTY.

United States Patent Office 3,315,031
Patented Apr. 18, 1967

3,315,031
SIGNAL INTERLACER
Eugene Kadak, Baltimore, Md., assignor, by mesne assignments, to the United States of America as represented by the Secretary of the Navy
Filed May 18, 1964, Ser. No. 369,052
4 Claims. (Cl. 178—6.6)

The present invention relates generally to recording devices and in particular is a mnemonic device for the interlace display of serial signals. Even more specifically, the present invention is an improved method and means for effecting a relatively high fidelity moving display for a sidelooking type of active sonar which is "viewing" the ocean bottom and objects thereon, if any.

Ordinarily, such a sonar is carried by a submarine vehicle which travels at a substantially constant height above the ocean floor, and a very narrow strip thereof is viewed by the sonar transducers at any one time. The view of a plurality of these narrow strips of ocean floor, of course, is the thing that is processed by the subject invention by recording, interlacing, and ultimately displaying electrical signals representing same in such manner that they may be viewed as a continuous moving picture in any appropriate readout, such as a strip chart or oscilloscope.

In the past, the prior art devices which produce such moving displays have, for the most part, been unsatisfactory because they do not provide good picture quality along with very short access time. For example, it is known from television experience that a cathode ray tube, that is utilized as the display element, is capable of producing fairly adequate picture quality, but, used alone, it does not provide a smoothly moving display. And in the instant sonar type application being considered herewith, the information or intelligence signals received by the sonar signal processing systems of the past do not provide a smoothly moving television type of presentation, since the time required to receive a frame is too long and there is no overlap between adjacent frames. Consequently, although saitsfactory for some purposes, the prior art devices of the category of this invention leave a great deal to be desired.

The present invention overcomes most of the disadvantages of similar prior art devices in that it enables smoothly moving, high quality displays to be presented on both a cathode ray tube screen and a continuous recorder strip chart for observation by a human operator.

It is, therefore, an object of this invention to provide an improved method and means for interlacing signals.

Another object of this invention is to provide a method and means for recording and storing interlaced signals.

Still another object of this invention is to provide an improved mnemonic device for the interlace display of serial electrical signals.

A further object of this invention is to provide an improved method and means for reading out the signals from a sonar set.

A further object of this invention is to provide an improved method and means of storing previously scanned odd and even numbered lines, respectively, for subsequent interlaced readout.

Another object of this invention is to provide a two-field type of signal interlace, wherein all odd lines of any particular frame are presented and then followed by presentation of all even lines thereof, with substantially no space therebetween.

Still another object of this invention is to provide a moving signal display having flicker reduced to an acceptable level without increasing the bandwith of the system.

Another object of this invention is to provide an improved picture on the screen of a cathode ray tube.

Other objects and many of the attendant advantages will be readily appreciated as the subject invention becomes better understood by reference to the following detailed description when considered in conjunction with the accompanying drawing wherein.

Figure 1:
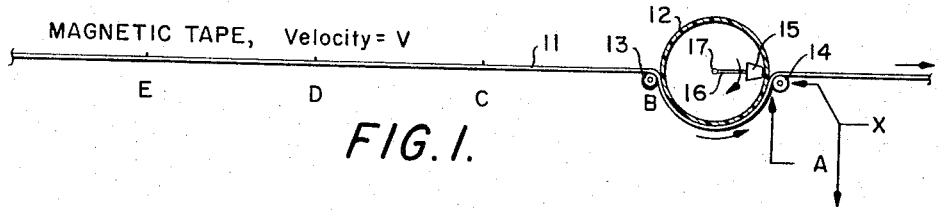
FIG. 1 is a diagrammatical representation of a single tape-single head signal interlacing system.

Referring now to FIG. 1, the simplified schematic representation embodying the unique principle employed in this invention is shown as saving a single movable magnetic tape 11 that is caused to be held snugly against the outside surface of a hollow cylinder 12 by a pair of idler pulleys 13 and 14. Cylinder 12 may be made of any nonmagnetic material, such as plastic or the like, having suitable physical and strength characteristics. Of course, tape 12 is caused to be pulled in the indicated direction by an appropriate reel or other means in such manner that it constantly remains in contact with cylinder 12 while it is being moved at some predetermined velocity $v$.

A record-playback head 15 is mounted on an arm 16 which, in turn, is mounted on a shaft 17 for rotation thereabout at a preferred angular velocity. For the purpose of explaining the inventive concept involved, only one tape is shown in FIG. 1, although as may be inferred from subsequently disclosed embodiments, a plurality of similar tapes similarly arranged may also be used.

Figure 2:
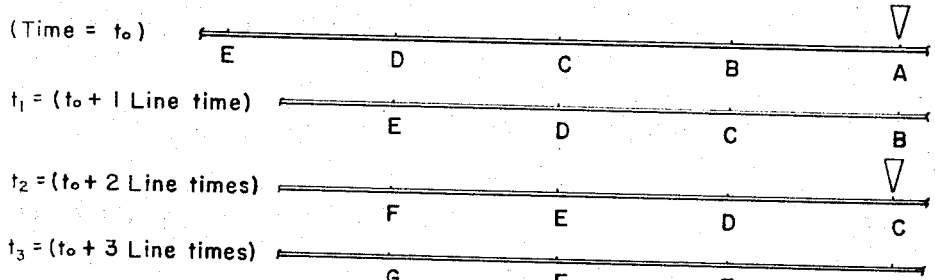
FIG. 2 is a representative signal timing diagram for the system of FIG. 1.

If, as is shown in this particular case, the single disclosed tape constitutes an odd line track, line number 1 would be recorded from A to C, line number 3 from C to E, etc., as a result of the relative rotational movement of head 15 and peripherical movement of tape 11 around cylinder 12. On the other hand, if this exemplified an even line track, line number 2 would be recorded from A to C, line number 4 from C to E, etc. Such relative tape and head movement is illustrated along with respective time indications in FIG. 2. Hence, it may readily be seen that the subject inventive concept theoretically provides zero dead time during the desired lines and zero dead space on the magnetic tape.

If both the odd and even tracks are desired to be shown on the same tape, two heads spaced 180° apart would be required to rotate about shaft 17. In such case a loop containing about one frame is rapidly scanned each one-half frame time.

In the foregoing representation, if a tape velocity of the order of 4.2 inches per second is used, the actual line length recorded on the tape is only about 0.28 inch. This, then, means that the diameter of cylinder 12 and also of the rotating head assembly would be 0.28/$\pi$ or 0.0892 inch—a very small diameter, indeed, for optimum practical operation. However, this diameter may be increased to a more practical and useful value which facilitates construction of operable structure by merely increasing the number of recording-playback heads used. With the proper design switching arrangement, two separate tapes may also be employed in a manner similar to that mentioned above in the explanation of FIGS. 1 and 2.

Figure 3:
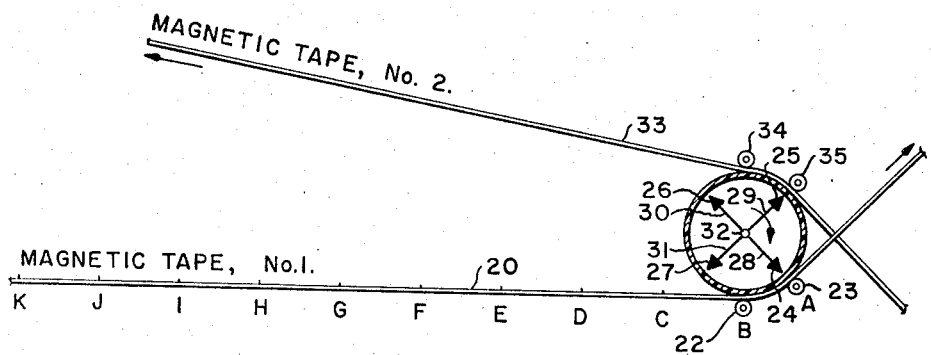
FIG. 3 is a diagrammatical representation of a dual tape-plural head signal interlacing system.

FIG. 3 schematically depicts an exemplary arrangement which will operate with an increased diameter cylinder in conjunction with two magnetic tapes. A first tape 20 contacts the outer surface of a cylinder 21 between the locations of idler pulleys 22 and 23 because said idler pulleys force it thereagainst. Heads 24 through 27 are respectively mounted on arms 28 through 31, which in turn are mounted for rotation at fixed relative angular positions about a shaft 32. A second tape 33 is likewise held against cylinder 21 by means of idler pulleys 34 and 35, and this tape cooperates with its respectively associated magnetic heads 26 and 27 to operate in a manner identical with the operation of tape 20 and its respectively associated heads 24 and 25.

Figure 4:
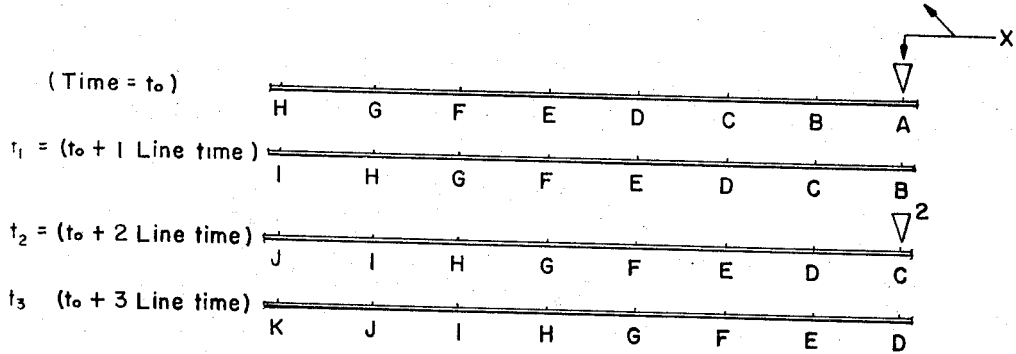
FIG. 4 is a representative signal timing diagram for one of the tapes of the signal interlacing system of FIG. 3 when used with dual recording and playback heads.

In order to simplify this disclosure, only the relative movements of tape 20 and its associated heads 24 and 25 have been shown in FIG. 4, but, obviously, tape 33 and its associated heads would timely operate in a similar manner and in alternation with the tape 20 arrangement. Again the general principle of operation is similar to that explained in connection with FIGS. 1 and 2, but it may be seen that the recording points, as represented by A and B, etc., are closer together due to the fact that the angular distance between heads 24 and 25 is approximately 90° instead of 180°. And, of course, if the points A and B, etc., were spaced apart the same distance as their comparable counterparts in FIG. 2, then the diameter of cylinder 21 would obviously be larger than the diameter of cylinder 12, and perhaps be more practical as well, depending on the actual size desirably designed into the structure and concomitant operational circumstances.

Another possibility which would allow the use of fewer heads or a single head and still have a reasonable diameter cylinder is the increasing of the magnetic recording tape speed. In addition, if desirable or necessary, re-recording from this tape onto another tape used for high speed scan in a manner to pack the information thereon in a predetermined space. The choice of these methods would, of course, be contingent upon the required design structural parameters as well as practical tape speed, with the latter probably controlling because of scanning head upper velocity limits.

Figure 5:
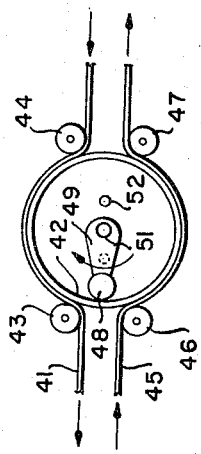
FIG. 5 is a diagrammatical representation of a dual tape-single head signal interlacing system.

FIG. 5 illustrates still another exemplary arrangement of the recorder constituting this invention. A first magnetic tape 41 is held against a peripherical sector of a hollow cylinder 42 by means of rollers or pulleys 43 and 44. A second magnet tape 45 is likewise held against a diametrically opposed peripheral sector of hollow cylinder 42 by means of rollers or pulleys 46 and 47. In this particular arrangement, it may be seen that the respective contact sectors of tapes 41 and 45 with cylinder 42 is something less than 180°. Although exaggerated for the purpose of disclosure simplification in FIG. 5, said sectors may be made to closely approach 180° by moving pulleys 43 and 45 and 44 and 47 closer together. However, at best there will probably be some slight gap therebetween, but for most practical purposes, this gap does not provide too much of an adverse effect.

A magnetic head 48 is attached to an arm 49 which is mounted on a shaft 51 for rotation thereabout. An electrical contact 52 is intended to timely contact a complementary electrical contact on arm 49 in such manner as to provide a synchronizing signal, as is well known and conventional in the electronic art. As can be seen, head 48 may be made to timely and alternately record my appropriate signals on tapes 41 and 45 as it rotates about shaft 51 for storing or memory purposes. And, on the other hand, head 48 may also be made to timely and alternately play back the signals previously recorded on tapes 41 and 45. Of course, in both of the aforementioned operations, there will be small gaps between adjacent signal groups due to said distances between pulleys and their respective tapes, but this will not cause difficulties for many operational purposes.

Figure 6:
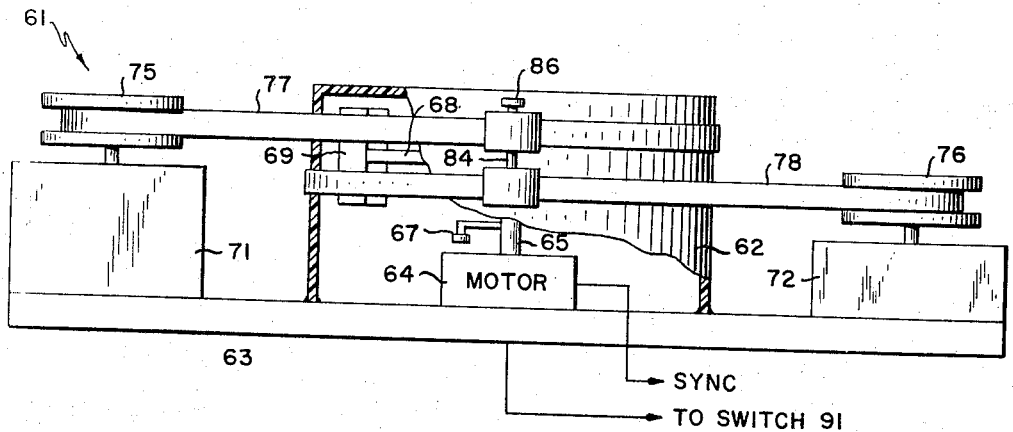
FIG. 6 is a front view of a typical structural embodiment of the signal interlacer constituting this invention.
Figure 7:
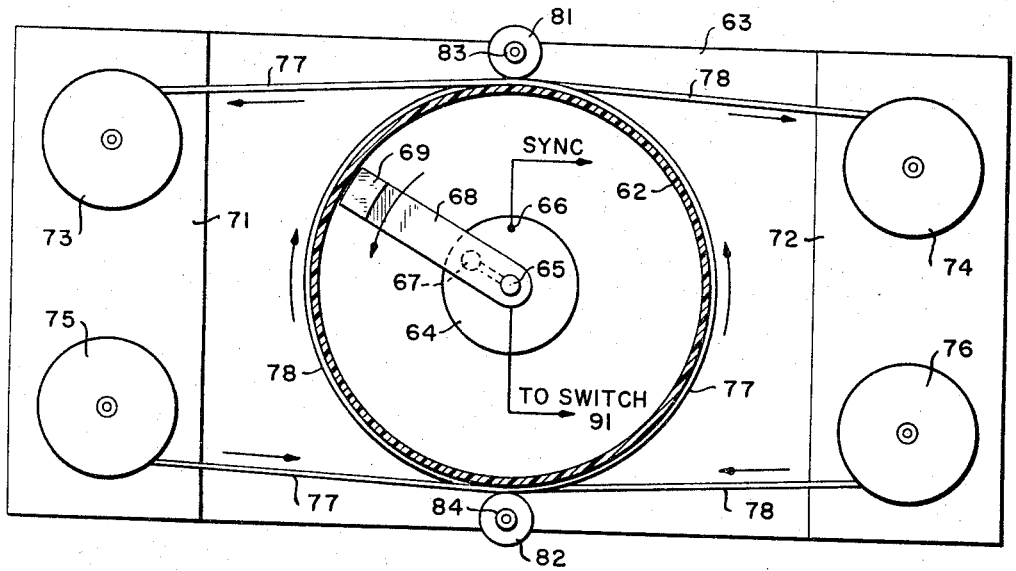
FIG. 7 is a top view of the device of FIG. 6.

Referring now to FIGS. 6 and 7, there is shown an exemplary preferred structural embodiment 61 of the subject interlace recorder. FIGS. 6 and 7 are side and top views, respectively, and, therefore, like parts thereof will be designated by the same reference numerals.

A hollow cylinder 62 of some non-magnetic material, such as plastic or the like, is mounted in any appropriate conventional manner on a stand or platform 63. A motor 64 is mounted on said platform and it has a shaft 65 which coincides with and extends along the axis of revolution of hollow cylinder 62. A pair of electrical contacts 66 and 67, respectively mounted on said motor 64 and said shaft 65, provide means for indicating the relative positioning therebetween by means of a timely produced sync signal. Because the associated circuitry to produce such sync signals is conventional and well known in the art, it is believed that an exemplary disclosure thereof is not necessary at this time. Suffice it to say, then, that a sync signal is produced when contacts 66 and 67 come together during the rotation of shaft 65.

Attached to shaft 65, at approximately the mid-position thereof, is an electromagnetic record-playback head 69. Head 69 is such that its influence extends a predetermined distance parallel to the inner surface of cylinder 62 and preferably has an end surface that is complementary therewith at the radial extremity thereof.

Spatially disposed from cylinder 62 and suitably mounted on stand 63 is a pair of tape recorders 71 and 72 which, for example, may be similar to the conventional commercially available tape recorders or which may be custom designed for this particular application. In either case, they should be so run that the two tape speeds are substantially the same for all practical purposes. If desired, the respective drive shafts thereof may be synchronized by any conventional means such as, for instance, belts and pulleys, etc., although these items are not shown in the drawing, in order to keep it as simple as possible, but still convey the inventive concept. In any event, tape recorders 71 and 72 each contain driving reels 73 and 74 and driven reels 75 and 76, respectively.

A first magnetic recording tape 77 is unwound from reel 75 and caused to be slidably positioned around cylinder 62 and connected to driving reel 73. The contact thereof with cylinder 62 is for 180°. Likewise a second magnetic recording tape 78 is unwound from reel 74, is caused to be slidably positioned around cylinder 62 in the same manner that tape 77 is positioned but on the opposite 180° outer peripherey thereof, and is connected to driving reel 76.

To insure that both of the aforesaid tapes maintain these proper positions on cylinder 62 as they slide therearound, respectively, a pair of rollers or pulleys 81 and 82 are urged against them in the direction of said cylinder. Rollers 81 and 82 may be mounted and so urged in any conventional manner, such as by shafts 83 and 84, which may, for example, be supported by resilient brackets 86 or springs and brackets or the like as is well known, for instance, in the capstan art.

It should be understood also that, although not shown, recorders 71 and 72 each have the necessary conventional controls for stopping, starting, recording, storing, playing back, etc., and that such controls may be employed to operate both recorders at the same time or independently, as desired.

Figure 8:
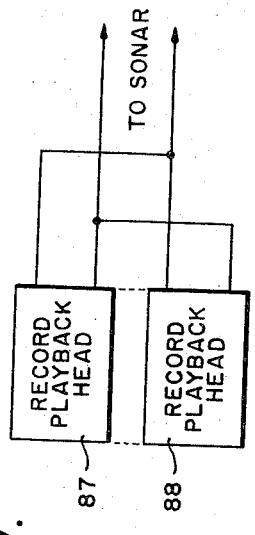
FIG. 8 is a block diagram representation of a dual head version of the type of electromagnetic head that may be incorporated in the device of FIGS. 6 and 7.

Head 69 may be a single unit having sufficient length to record on or play back from both tapes 77 and 78 as a result of being in operational proximity therewith. On the other hand, a pair of electromagnetic record-playback heads 87 and 88, such as is represented in FIG. 8, may also be used as head 69 if so desired. Although in this embodiment, heads 87 and 88 are shown as being connected in parallel, they obviously may be connected in series, if so doing will otherwise expedite or optimize the operation of the subject invention, since so doing would certainly be well within the purview of the artisan having the benefit of the teachings presented herewith.

Figure 9:
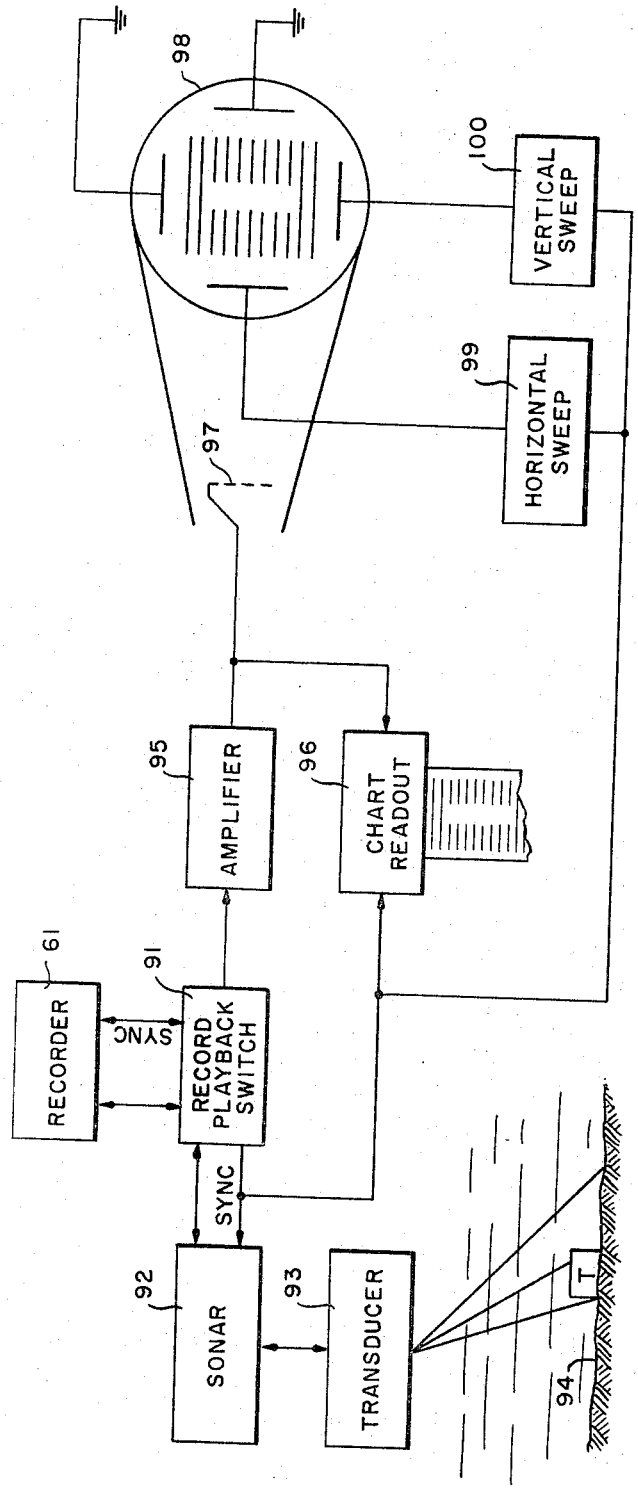
FIG. 9 is an examplary system which may use the subject signal interlacer to an advantage.

Referring now to FIG. 9, there is illustrated a system which may typically incorporate the subject recorder portion of this invention to an advantage.

Recorder 61 is shown as connected to a record-playback switch 91 which, in turn, is coupled to a sonar 92. A transducer 93, which in this embodiment may, for example, be a reversible electroacoustical transducer is connected to sonar 92. Transducer 93, of course, is intended to broadcast a sweep of predetermined acoustical energy through the water toward the sea floor 94 where a target T may be located.

Switch 91 is also coupled through an appropriate amplifier 95 to a recording chart readout 96, which may, for example, be a conventional and commercially available helical recorder, and/or the intensity grid 97 of a cathode ray tube 98 located in a suitable conventional readout oscilloscope. In order to provide proper timing for the line displays of said cathode ray tube, horizontal and vertical sweeps 99 and 100 are properly synchronized by the sync signal received through switch 91 from recorder 61. For similar reasons, chart readout 96 is likewise supplied with said sync signal.

Briefly, the operation of the subject invention is as follows:

The foregoing theoretical explanation of the inventive concept of this invention, presented in connection with the discussion of FIGS. 1 through 4, should be borne in mind now, since the principles involved apply to the structural representations depicted in FIGS. 5 through 7.

Considering first the schematic representation of the recorder illustrated in FIG. 5, it may be seen that magnetic tapes 41 and 45 are moved in opposite directions around hollow cylinder 42 at some predetermined velocity. Simultaneously therewith, the rotation of arm 49 and recording-playback head 48 connected thereto in the direction opposite the direction of travel of said tapes, causes them to be scanned at some given relative velocity. Of course, it may readily be seen that some dead time occurs between the two tapes whenever the scanner is transferring from one tape to the other, but this may be minimized by making both tapes have as close to 180° contact with cylinder 42 as is physically possible and still have an operable structure.

When the aforesaid relative movement exists and the recording of signals received from some associated external source is taking place, half of them are stored on tape 41 and half on tape 45. Thus, if the storing of signals on tape 41 occurs while odd numbered sweeps or lines are occurring or being scanned by a pick-up device and the storing of signals on tape 45 occurs while even numbered sweeps or lines are occurring or being scanned by a pick-up device, they may subsequently be played back in an interlaced arrangement for optimizing the display thereof. If, for example, such a recorder were substituted for recorder 61 in the system of FIG. 9, the chart of recorder 96 and the screen of cathode ray tube 98 would readout and display said lines in interlaced form to provide a higher fidelity picture than would otherwise occur.

The device of FIGS. 6 and 7 work in a manner which is substantially similar to the operation of the device of FIG. 5, except that the structure and timing is such that there is practically no dead time between the scanning of tapes 77 and 78 by head 69. As may be seen in this case, each tape (that is, both tapes 77 and 78) constantly maintains 180° contact with cylinder 62 while they are being unwound from reels 75 and 76 by driving reels 73 and 74, respectively. Hence, for all practical purposes, there is no transfer time between tapes as they are being scanned by rotating head 69. Although not shown, it should be understood that both tapes 77 and 78 are normally synchronized to run at the same constant speed, but, if so desired, they may also be made to run (or not run) independently at speeds that are advantageous for any given operational circumstances. Since so doing would merely be a matter of design choice, it would be obvious to one skilled in the art to provide the appropriate synchronizing elements and operational controls for effecting such operation.

FIG. 9 illustrates a typical sonar system which may incorporate the aforementioned recorder of FIG. 6 to an advantage. In this system, sonar system which may incorporate the aforementioned recorder of FIG. 6 to an advantage. In this system, sonar 92 causes transducer 93 to transmit a substantially vertically oriented fan-shaped beam of sweeping acoustical energy which is subsequently reflected back from sea floor 94 and target T. When switch 91 is in the record position, recorder 61 records and stores the electrical equivalent of said received energy in accordance with the operational procedure discussed in connection with the device of FIG. 6. Thus, for instance, alternate energy sweeps may alternately be recorded on a pair of properly running tapes by an appropriately revolving magnetic head.

Switching switch 91 to the playback condition will then allow recorder 61 to supply the stored information in interlaced form as a result of alternately and timely playing back from both tapes. Then, properly synchronized readouts such as an oscilloscope, or helical recorder, or the like, will display a higher fidelity picture of the seafloor and/or object being scanned than would otherwise be displayed without the benefit of the signal interlacing produced by the subject invention.

Obviously, many modifications and other embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A signal interlacer means comprising in combination:

a hollow cylinder;

a first magnetic tape contiguously disposed with said hollow cylinder for movement in a predetermined direction around a first exterior peripheral sector thereof;

a second magnetic tape contiguously disposed with said hollow cylinder for movement around a second exterior peripheral sector of said hollow cylinder;

an electromagnetic recording-playback head means mounted in said hollow cylinder for rotary movement therein adjacent to the inner peripheral surface thereof and for timely disposition within the magnetic influence range of said first and second magnetic tapes;

means connected to said electromagnetic recording-playback head means for the driving thereof in a predetermined rotary direction;

means connected to said first and second magnetic tapes for the driving thereof in predetermined circular directions around their respective peripheral sectors of said hollow cylinder;

means connected to said means for driving said electromagnetic recording-playback head means and to said electromagnetic recording-playback head means for producing a synchronizing signal that is indicative of an instantaneous predetermined disposition of said electromagnetic recording-playback head means, as it rotates within said hollow cylinder; and means connected to said first and second magnetic tape driving means, said electromagnetic recording-playback head means, and the aforesaid hollow cylinder for the mounting thereof in a predetermined geometrical configuration.

2. The device of claim 1 wherein said first and second magnetic tape driving means is a driving means that will effectively drive said first and second magnetic tapes in the same circular directions around their respective peripheral sectors of said hollow cylinder, and said electromagnetic recording-playback head means driving means drives said electromagnetic recording-playback head means in a direction opposite the circular direction said first and second magnetic tapes are driven.

3. The invention according to claim 1 further characterized by means effectively connected to said synchronizing signal producing means and to said electromagnetic recording-playback head means for supplying signals to said electromagnetic recording-playback head means for, in turn, timely effecting the recording thereof on said first and second magnetic tapes, and for timely receiving and displaying the signals from said electromagnetic recording-playback head means which were previously recorded on said first and second magnetic tapes.

4. A method of alternately recording and alternately displaying as a substantially continuous moving picture a pair of sets of signals comprising the combined steps of:

moving a first magnetic tape in a predetermined circular direction around a first exterior peripheral section of a hollow cylinder;

moving a second magnetic tape in a predetermined circular direction around a second exterior peripheral sector of said hollow cylinder;

rotating an electromagnetic recording-playback head means within said hollow cylinder in adjacent disposition with the inner peripheral surface thereof, alternately within the magnetic influence range of said first and second magnetic tapes, and in a predetermined circular direction;

generating a synchronizing signal that represents an instantaneous predetermined disposition of said electromagnetic recording-playback head means, as it is rotated within said hollow cylinder;

timely supplying said electromagnetic recording-playback head means with sets of signals, as it is rotated within said hollow cylinder, for effecting the alternate recording thereof on said first and second magnetic tapes;

timely and alternately receiving from said electromagnetic recording-playback head means said sets of signals respectively recorded on said first and second magnetic tapes; and alternately displaying in response to said synchronizing signal said sets of signals recorded on said first and second magnetic tapes in such manner as to effect a substantially continuous moving picture thereof.

References Cited by the Examiner

UNITED STATES PATENTS

| | | | |
|---|---|---|---|
| 2,378,383 | 6/1945 | Arndt | 340—16 X |
| 2,903,521 | 9/1959 | Ellison | 179—100.2 |
| 2,986,722 | 5/1961 | Williams | 346—74 |
| 2,995,725 | 8/1961 | Kliever et al. | 340—3 |
| 3,142,032 | 7/1964 | Jones | 340—3 |
| 3,197,559 | 7/1965 | Kihara | 179—100.2 X |

CHESTER L. JUSTUS, *Primary Examiner.*

R. A. FARLEY, *Assistant Examiner.*